INVENTORS
LEONARD C. BLANDING
HANS J. MEYER
KENNETH A. LIEBLER

INVENTORS
LEONARD C. BLANDING
HANS J. MEYER
KENNETH A. LIEBLER 3,433,538

DYNAMIC GAS FILM BEARING STRUCTURE

Leonard C. Blanding, Hans J. Meyer, and Kenneth A. Liebler, Grand Rapids, Mich., assignors to Lear Siegler, Inc.

Filed Feb. 24, 1966, Ser. No. 529,714
U.S. Cl. 308—9 8 Claims
Int. Cl. F16c 7/04, 35/00, 27/00

ABSTRACT OF THE DISCLOSURE

The instant invention comprises a structure for supporting and retaining the transducer element of a gas film bearing within a housing. The support and retaining structure comprises a resilient ring-like member which is mounted between the housing and the transducer elements to hold them in spaced relation. The ring-like member is constructed such that, when operably positioned, it is resistive to linear and torsional stress yet readily yields to radial stresses.

This invention relates to volatile magneto-strictive elements and piezoelectric ceramics and to the dynamic gas films which may be provided by such devices under certain conditions; and more particularly it relates to bearing structures utilizing such gas films to support relatively moving members under essentially frictionless conditions.

As was disclosed in copending U.S. patent application Ser. No. 323,789, now U.S. Patent No. 3,339,421, issued Sept. 5, 1967, assigned to the assignee of the present invention, and as has since become known at least to some extent within the art, ceramic structures of a piezoelectric or magnetostrictive character may be used to produce a relatively thin dynamic gas film when the ceramic is placed closely adjacent another similarly configured surface and vibrated by appropriate excitation. Further, such a film may be used to support the member whose surface is closely adjacent the ceramic structure in what is essentially a frictionless manner, since only the film of rapidly vibrating gas is present in the space between the two elements. This is, of course, of major importance with regard to such devices as inertial guidance instruments, wherein the frictional effects upon rapidly rotating elements is of very great concern.

In the construction of a dynamic gas film bearing of the character just described, the mounting and retention of the virbatile ceramic element is of particular importance. Some previous devices fixedly secured the ceramic element to its support, as by an appropriate cement such as epoxy. However, since the ceramic undergoes vibrating motion or vibratile deformation when under excitation, fixedly mounting the ceramic results in a considerable reduction in operating efficiency and in functional integrity. Also, its long-term dimensional stability undergoes degradation. Basically, what is required, particularly with regard to the tubular or cylindrical ceramic elements and supports typically found in instruments is a supporting structure for the ceramic that is essentially rigid to linear and torsional stresses, but which is compliant and readily yieldable to radical stresses, since the latter produce the supporting gas film and should not be damped or restricted.

The present invention has as one of its major objects the provision of a new concept for such a mounting structure, embodied in an elongate resilient media located between a fixed support mount and the vibratile ceramic, by which these two components remain in a spaced condition, while the diametral strain or displacement of the ceramic under excitation is absorbed by the resilient member as bending mode and is virtually unimpeded.

A further important object of the invention is the provision of a resilient ceramic-mounting member of the foregoing nature which is embodied in a pair of separate mounting elements positioned near the opposite ends of the ceramic element. This embodiment has the advantage of supporting the ceramic near its ends, for increased rigidity to torsional stresses. Further, the separate supporting elements may be designed with an angle which matches (i.e., is normal to) the piezo or strictive motion angle of the ceramic, for optimum support performance in a radial or diametral mode of vibration.

The foregoing paramount objects of the invention, together with additional objects and the many advantages made possible thereby, will become increasingly apparent to those skilled in the pertinent arts upon a further consideration of the ensuing specification and its appended claims, particularly when taken in conjunction with the accompanying drawings illustrating the preferred embodiments herein disclosed.

Figure 1:
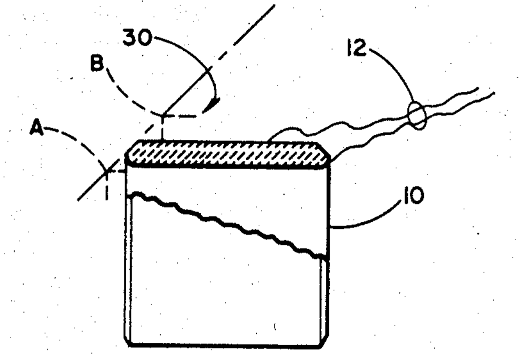
FIG. 1 is a side elevation, partially in section, showing an illustrative cylindrical piezoelectric ceramic.

Referring now in more detail to the drawings, a generally cylindrical form of vibratile ceramic element is shown at 10 in FIG. 1 for purposes of illustration. As will be understood, this is a somewhat typical ceramic configuration which has many instances of usage in connection with tubular or cylindrical support and bearing elements in a wide variety of applications, particularly in inertial instruments. As will also be understood, the element 10 is of the class of substances having what is termed piezoelectric characteristics, and hence is referred to herein as a "piezoelectric transducer," or merely as a "ceramic." When a pair of leads such as 12 are attached to the ceramic 10 and coupled to an external source of alternating current, the ceramic will be alternatingly strained or deformed (i.e., it becomes vibratile) along its length, thickness and diameter, as is well known.

Figure 2:
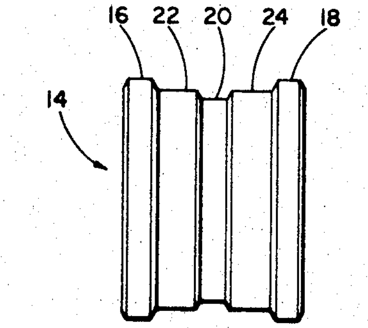
FIG. 2 is a side elevation of a first embodiment of the ceramic-mounting structure of the invention.
Figure 3:
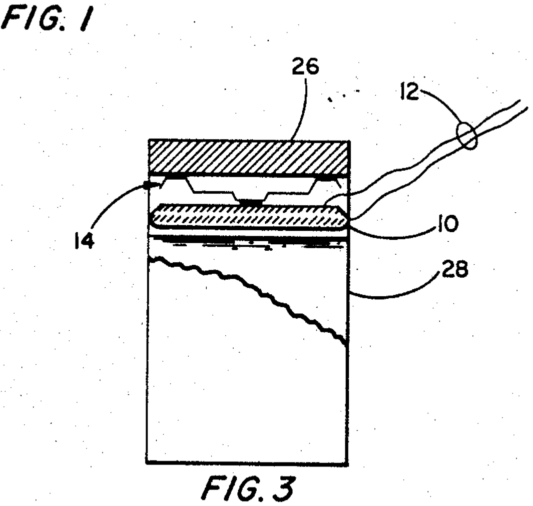
FIG. 3 is a side elevation partially in section, of an assembled gas film bearing structure utilizing the mounting structure of FIG. 2.

A first embodiment of a preferred means for mounting a ceramic such as 10 in a gas film bearing structure is illustrated in FIG. 2, and a bearing structure having such a ceramic and mounting means is seen in FIG. 3. The mounting means 14 of FIGS. 2 and 3 is generally tubular in form and somewhat cylindrically shaped. More specifically, at its ends the mounting means 14 has a pair of enlarged annular ring portions 16 and 18, and at its center a reduced annular ring portion 20. These enlarged and reduced portions are interconnected by the walls of the tubular mounting means, which are basically cylindrical at intermediate portions 22 and 24. The cylindrical mounting means 14 is a one-piece unit, and preferably is formed from a thin resilient material such as spring steel, electrodeposited nickel, or the like.

The embodiment of the assembled bearing structure seen in FIG. 3 is actually a simplified form of bearing, in which the diametral strain of the ceramic 10 is of primary design concern, while other strains are not of major importance. In this embodiment, it will be seen that an exterior fixed supporting and retaining frame 26 which is cylindrical in form is telescoped over and about the ceramic 10, such that there is a relatively narrow tubular spacing maintained therebetween. The mounting means 14 is utilized within this space to compliantly mount the ceramic 10 in circumferentially spaced relation from the support or frame 26. As illustrated, this is accomplished by securing the support to the mounting means at the enlarged ring portions 16 and 18, and securing the ceramic 10 to the mounting means at the reduced ring portion 20. The mounting means 14 may be secured to the frame by solder or cement or the like, and the ceramic 10 may be secured to the mounting means in a similar manner but preferably by a non-damping cement or the like, such as is known in the art.

As will be understood, the bearing assembly of FIG. 3 also includes a bearing member 28 which is typically cylindrical in form and which is closely interfitted within the interior of the ceramic 10, such that a very narrow tubular spacing is provided completely around the periphery of the bearing member. It is within this spacing that the dynamic gas film is created by the vibrations of the ceramic 10 under suitable electrical excitation, as is disclosed in the above-identified United States Patent No. 3,339,421 issued Sept. 5, 1967. As set forth therein, the dynamic gas film actually supports a bearing member such as 28 in levitation relative to the piezoelectric transducer, such that only the film is in contact with the bearing member, providing what is an essentially frictionless bearing.

It is in this connection that the mounting means 14 of the invention is of great importance. That is, when the piezoelectric transducer or ceramic is excited, its diameter is strained, and consequently the reduced ring portion 20 of the mounting means cemented or affixed to the vibratile ceramic is also strained. Due to its thin resilient structure, the radial constraint offered by the entire mounting means is very minor. Actually, when non-damping cement is used to secure the central portion 20 to the ceramic 10, such constraint is elastic in nature and only adds to the vibratile resonance of the ceramic and gas film bearing system. Experiments have shown that the mounting structure does not produce any important increase in the piezoelectric circuit impedance, nor does its radial constraint produce any important decrease in the diametral strain of the ceramic. Further, the minor radial motions produced by the vibrating ceramic are absorbed by the cylindrical portions 22 and 24 of the mounting means as a bending mode, and virtually no strain is reflected or coupled to the fixed outer support frame 26.

As will be appreciated, stresses in directions parallel to the longitudinal axis of the ceramic transducer become direct compression and tension in the opposite cylindrical portions 22 and 24 of the mounting means 14, while torsional stresses produce torsional shear forces in the same cylindrical portions. Torsional stresses about any axis normal to the longitudinal axis of the ceramic transducer impart complex stresses in the cylindrical mounting means portions 22 and 24, which vary from tension-compression to tubular shear. In the latter mode of stress the tension-compression stresses act to restrain the torsional forces, with the end result being that the mounting means is very rigid to all forms of stress except those produced by radial strains of the ceramic, to which a very compliant mounting is provided by the bending mode which has been noted. Consequently, the vibration of the ceramic in the desired mode are maximized, whereas translations of the ceramic are restrained.

Figure 4:
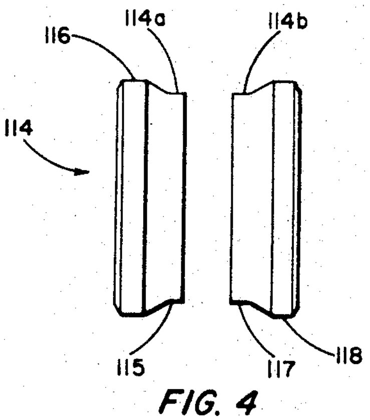
FIG. 4 is a side elevation of a second embodiment of the ceramic element-mounting structure of the invention.
Figure 5:
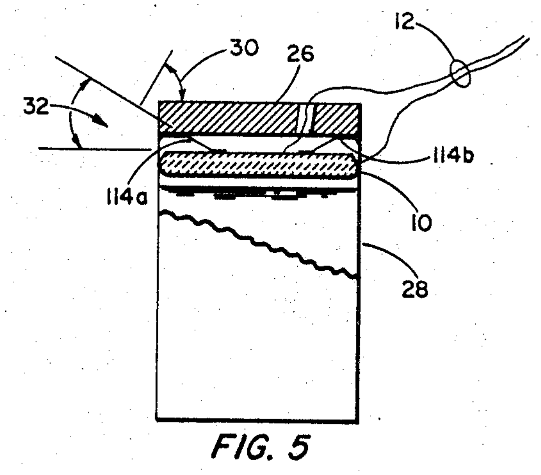
FIG. 5 is a side elevation, partially in section, of an assembled gas film bearing structure utilizing the mounting strutcure of FIG. 4.

A second form of piezoelectric transducer mounting means 114 is illustrated in FIG. 4, and a second form of gas film bearing structure utilizing such mounting means is seen in FIG. 5. This form of mounting means is adapted to more completely utilize the vibratile strains of the ceramic. For example, a greatly exaggerated exemplary pattern of motion for one corner of the typified ceramic 10 is seen in FIG. 1, wherein the upper left corner of the ceramic is shown moving from its nominal position indicated in solid lines to the two extreme positions A and B, indicated in phantom. Such motion is produced by the combined diametral and longitudinal strains of the piezoelectric transducer under piezoelectric excitation, and the broken line drawn through the projected corners of the ceramic illustrates the angle of straining motion 30 of the transducer element. As will be seen, the mounting means 114 is designed to match (i.e., be perpendicular to) the aforesaid angle 30 of ceramic transducer motion, for optimum performance.

As illustrated, the mounting means 114 of FIG. 4 includes two separate elements **114*a* and 114*b*. Each of these has an enlarged annular ring portion 116 and 118, respectively, and is conically reduced from this ring to an inwardly-directed annular portion 115 and 117, respectively, at its opposite end. As in the case of mounting means 14 seen previously, mounting means 114 is preferably made from a thin, resilient material such as spring steel. From FIG. 5, it will be seen that an assembled bearing structure utilizing the mounting means 114 may in general closely resemble the bearing structure of FIG. 3, and include a rigid support frame 26, a ceramic transducer 10, and an internal bearing member 28. However, the halves 114*a* and 114*b* of the mounting means are now used to support each end of the ceramic 10 relative to the mounting frame 26**, which in itself is an added advantage.

The conical configuration of each of the ring-like halves of the mounting means forms an angle 32 relative to the longitudinal axis of the transducer ceramic and bearing structure, which quite apparently can readily be made the complement of the angle 30 of strictive transducer motion, i.e., the conically-angled wall of the mounting means rings **114*a* and 114*b* is perpendicular to the straining motion of the ceramic. This form of ceramic transducer support has all of the radial compliance and basic environmental rigidity of the somewhat simpler form of mounting means 14 seen previously, while additionally the rigidity to torsional stresses of the mounting means is increased significantly. Thus, by choosing particular design parameters for the diameter and length of the ceramic transducer element, conical mounting means such as 114*a* and 114*b*** may be used regardless of whether the transducer strain is maximized longitudinally, as for use as a thrust bearing, or diametrically, for use as a journal bearing. In any such case, the conical angle of the mounting means can be proportioned to match the ceramic motion angle for optimum performance.

Figure 6:
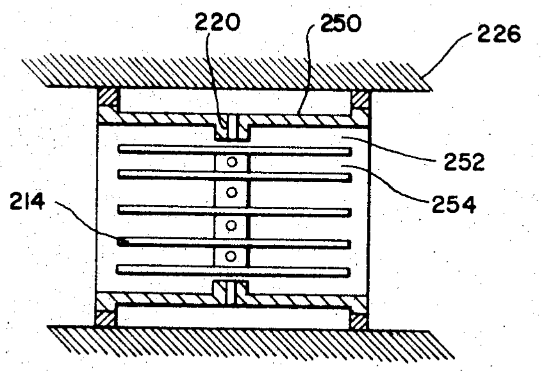
FIG. 6 is a side elevation in central section of a third embodiment of the ceramic-mounting structure of the invention.
Figure 7:
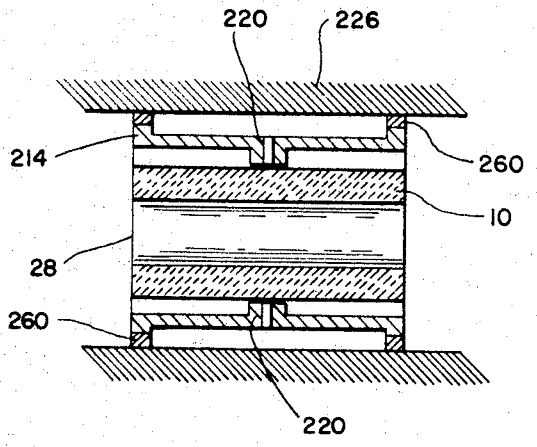
FIG. 7 is a side elevation in central section of an assembled bearing structure utilizing the mounting structure of FIG. 6.

A third embodiment of a resilient mounting means 214 for a piezoelectric transducer element is seen in FIG. 6, and an exemplary gas film bearing structure utilizing such a construction is illustrated in FIG. 7. As will be apparent upon inspection, the mounting means 214 is somewhat similar in nature to that designated 14 and described in connection with FIGS. 1 and 2. Basically, mounting means 214 is a cylindrical tubular element made from spring steel or the like, having a centrally located internal ridge or ferrule 220 extending circumferentially therewithin. Further, the tubular mounting means 214 is slotted longitudinally at spaced intervals about its cylindrical periphery, so as to produce a series of adjacent strap-like arms such as 250, 252, 254, and the like, each having a central inwardly-directed lug or offset portion making up the ridge 220. The slots in the tubular mounting means do not extend the entire length thereof, however, but instead are foreshortened to produce integral annular portions at each end of the cylindrical structure which interconnect the arms 250, 252, and the like.

In a typical gas film bearing utilizing the ceramic mounting means 214 (FIG. 7), the ceramic element 10 is secured within the tubular mounting means 214 by cementing the outer diameter of the ceramic to the inner surfaces of the ridge or ferrule 220, as illustrated. As in the previous bearing structures, the bearing member 28 is telescoped into the ceramic so as to be narrowly spaced therefrom. The mounting means 214 is secured to an appropriate external support and retaining frame 226 around the circumferential perimeter at each end of the mounting means, as shown, as by cementing the mounting means into position, or by a desired generally rigid annular spacer such as 260 secured to the mounting means and pressed into position within the supporting frame. Due to the slotted nature of the mounting means 214, and the separate interconnected arms provided thereby, the embodiment of the mounting means 214 provides a mounting for the ceramic which is compliant and flexible both axially and radially, to thereby further enhance the freedom of the straining motion produced by the resonant vibration of the ceramic transducer.

From the foregoing, it will be quite apparent to those skilled in the art that the present invention provides a unique and desirable means of supporting piezoelectric transducer elements, embodied in novel dynamic gas film bearing structures, which means considerably enhance and facilitate the operation of such transducer elements through the reduction and elimination of degenerative forces and reactions which heretofore were an integral part of such devices. It is entirely conceivable that upon considering the foregoing disclosure, others may embody the concepts which underlie the invention in other specific forms and mechanisms, or may make certain modifications or variations in the specific structures shown and described as preferred embodiments hereinabove. Consequently, all such other embodiments and modifications as are based upon the concepts of the invention and are clearly within its spirit are to be considered as within the scope of the claims appended herebelow, unless these claims by their language specifically state otherwise.

We claim:

1. A dynamic gas film bearing structure, comprising in combination: support and retaining structure; a piezoelectric transducer element for producing such a film upon suitable excitation; a bearing member positioned closely adjacent said transducer element to be levitated upon said film; and a resilient member located between said structure and said transducer element for maintaining portions of the two in spaced relation; said member arranged to nonrigidly and compliantly support said transducer element relative to said structure along at least one of the strain axes of said element.

2. The bearing structure of claim 1, wherein said member between said structure and said transducer element has at least one portion formed of thin resilient material extending at an acute angle between said structure and transducer.

3. The bearing structure of claim 2, wherein said resilient member is secured to each of said structure and element at points of contact therewith.

4. The bearing structure of claim 3, wherein said structure and said transducer element are elongated, and wherein said resilient member has opposite ends which are secured near the opposite ends of one of said structure and element; said member further having an offset central portion extending toward the other one of the structure and element at said angle; said resilient member being relatively rigid lengthwise to inhibit lengthwise relative motion between said structure and element, and being laterally flexible to compliantly permit relative normal motion between said two.

5. The bearing structure of claim 4, wherein said structure and transducer element are tubular and arranged to fit one within the other, and wherein said resilient member is also generally tubular and arranged to fit between the structure and transducer.

6. The bearing structure of claim 5, wherein said generally tubular resilient member is longitudinally slitted to provide a plurality of generally independent adjacent resilient arms.

7. The bearing structure of claim 2, wherein said structure and said transducer element are cylindrical and arranged to fit one within the other, and wherein said means between said structure and element comprise a pair of generally conically shaped resilient rings; one of said rings being located near each end of said structure anl element and telescoped over the inner one thereof to extend therebetween at said angle.

8. The bearing structure of claim 7, wherein said rings are thin-walled members whose conical angle is generally perpendicular to the angle of straining motion of said transducer element.

References Cited

UNITED STATES PATENTS

| | | | |
|---|---|---|---|
| 2,951,729 | 9/1960 | Skarstrom | 308—9 |
| 3,171,696 | 3/1965 | Houghton | 308—1 |
| 3,239,283 | 3/1966 | Broeze et al. | 308—9 |

MARTIN P. SHWADRON, *Primary Examiner.*

F. SUSKO, *Assistant Examiner.*

U.S. Cl. X.R.

308—26